United States Patent [19]

Froggatt

[11] Patent Number: 4,472,811

[45] Date of Patent: Sep. 18, 1984

[54] SUBSCRIBERS LOOP SYNCHRONIZATION

[75] Inventor: Dennis G. Froggatt, Felsted, England

[73] Assignee: International Standard Electric Corporation, New York, N.Y.

[21] Appl. No.: 377,219

[22] Filed: May 11, 1982

[30] Foreign Application Priority Data

May 14, 1981 [GB] United Kingdom ............... 8114745

[51] Int. Cl.³ ............................................. H04L 7/06
[52] U.S. Cl. ................................... 375/111; 370/105
[58] Field of Search ............... 370/100, 108, 106, 105; 375/106, 114, 116, 111; 371/42, 49

[56] References Cited

U.S. PATENT DOCUMENTS

| 4,214,124 | 7/1980 | Jarus | 375/114 |
| 4,242,755 | 12/1980 | Gauzan | 375/114 |
| 4,271,520 | 6/1981 | Coombes et al. | 371/42 |
| 4,412,329 | 10/1983 | Yarborough, Jr. | 371/42 |

Primary Examiner—Benedict V. Safourek

Attorney, Agent, or Firm—John T. O'Halloran; Alfred C. Hill

[57] ABSTRACT

In a PCM system, it is desirable for the two ends to remain in synchronization, and for this purpose both channel associated and non-channel associated synchronizations are used.

The PCM code combinations are eight bit codes, each with a ninth bit for sync and a tenth bit for data. When sync search is in progress, either at switch on or after sync has failed, the seventh and eighth bits of the PCM code bits are used to convey additional sync thus reducing the risk of simulation. To locate the sync. all other bits except the sixth and tenth bits are set to zero, the sixth and tenth bits being at one. Thus, two ones are separated by five zeros to form a pointer used to locate the sync pattern. The sync pattern is located by storing a data frame on reception and shifting it to find the combination of two ones separated by five zeros. The shift needed to find the combination indicates the extent of misalignment and is used to bring the receiver clock into alignment with the incoming bit streams.

4 Claims, 7 Drawing Figures

SYNC SEARCH PATTERN WITH PARITY.

SUBSCRIBERS LOOP SYNCHRONIZATION

BACKGROUND OF THE INVENTION

This invention relates to telecommunication systems of the fully digital type, and especially to arrangements in such systems for providing synchronization between the subscriber's terminal and the system node or switch to which that terminal is connected.

In such a system voice, data and signaling information are transmitted in a multiplexed digital bit stream, using the well-established 8 bit PCM digitization extended to give, for example, an 80 kb/s (Kilobits per second) bit stream. On reception at a receiver, either at a terminal or at a system node or switch, it is necessary to determine bit, frame and multiframe timing. To check synchronism, a synchronizing pattern is sent within the multiframe, which usually embraces four ordinary frames. It is desirable to rapidly synchronize on switch-on and to rapidly resynchronize during receiving from synchronization failure.

One proposed method is to initially send a synchronization signal using the full baseband bandwidth until synchronization is attained, and then revert to the normal synchronization pattern in a multiframe time slot. This has disadvantages due to the need to switch from one synchronization system to another. A second proposed method is to send the normal synchronization pattern in the multiframe, but with all other bits at zero during the synchronization acquisition period. This has limitations in certain implementations, especially in noisy conditions which may cause extended time being needed to achieve synchronization.

SUMMARY OF THE INVENTION

An object of the present invention is to provide a method of and apparatus for achieving synchronization in a receiver which is more rapid and simpler than those hitherto used.

According to the invention there is provided a digital PCM transmission system, in which the intelligence to be conveyed is handled in bit frames each of which can include an x bit PCM code combination, an (x+1)th bit usable, inter alia, for conveying synchronization information and at least an (x+2)th bit usable for conveying other intelligence. When a synchronization search occurs in a receiver of the system, either on switching the system on or in response to the loss of synchronization in the receiver, a plurality of y adjacent bits including the xth bit place, of the bits normally used for PCM, are used to convey synchronization information to the receiver. In each bit frame used to convey synchronization information during a synchronization search the (x+2)th bit and the bit preceding the plurality of adjacent bits are both set to a first binary condition with all other bits normally used for PCM set to the second binary condition, so that the pattern received during synchronization search includes two bits in the first binary condition separated by (x−y) bits in the second binary condition. On reception of the bit stream sent during synchronization search a complete frame of the bit frames is stored in a buffer store. The stored bits are tested for the presence of the combination of two bits in the first condition separated by (x−y) bits in the second condition. The received bits are shifted under clock pulse control until the combination is detected and the extent of the shift needed to detect that combination is noted. The clock is adjusted in accordance with the extent of shift to bring the clock into alignment with the bit stream.

BRIEF DESCRIPTION OF THE DRAWINGS

Above-mentioned and other features and objects of this invention will become more apparent by reference to the following description taken in conjunction with the accompanying drawing, in which.

DESCRIPTION OF THE PREFERRED EMBODIMENT

The synchronization arrangement to be described is intended to determine and control the alignment of the received bits to ensure that digit integrity is maintained, to determine the alignment of the received frame and to identify frames within the multiframe. The system must provide for the initial detection of synchronization in both directions of the subscriber's loop during call set-up, the monitoring of synchronization during call, and the recapture of synchronization after failure during the call. The last should be achieved within the capabilities of common error detection systems, and preferably without interfering noticeably with speech.

The synchronization pattern has to be so chosen that it is easily generated, easily detected, not unduly noise-sensitive, not easily simulated by traffic and should permit rapid recovery from loss of synchronization. During initialization the synchronization pattern transmitted from a transmitter should permit synchronization of a receiver to be accomplished quickly and unambiguously.

Figure 1:
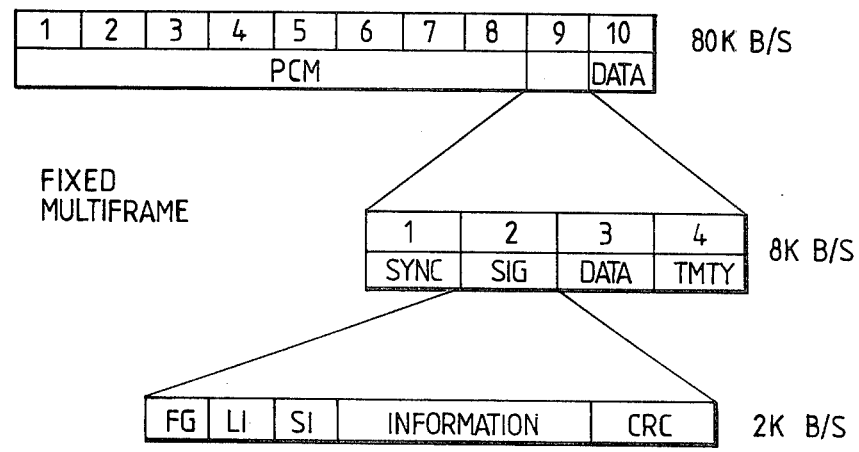
FIGS. 1 and 2 show two known bit multiplex arrangements for the bits in a bit stream.
Figure 2:
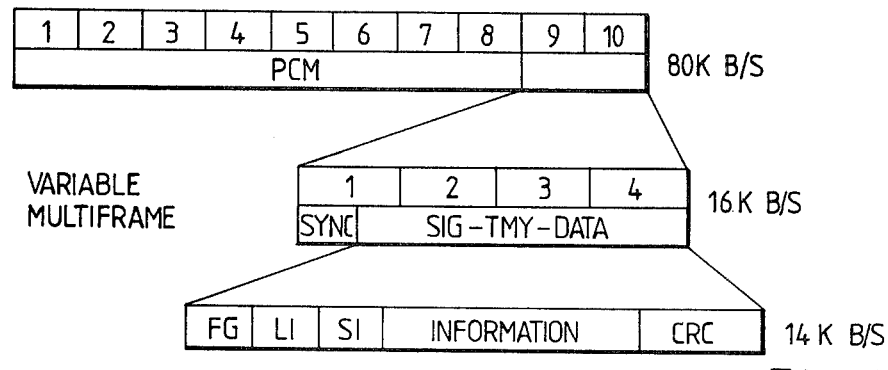

The arrangement to be described herein was designed for use in 10 bit interleaved systems, in which there are four frames in a multiframe, an example of the bit arrangement for which is shown in FIGS. 1 and 2, but is applicable to other bit interleaved systems of more than 10 bits and more than four frames. It is also applicable to other more advanced systems. In FIG. 1, in each word bit 10 is used to provide a data channel and bit 9 is used to provide several functions. In frame 1 of four frames of a multiframe bit 10 is used to provide a date channel and bit 9 is used to provide several functions. In frame 1 of four frames of a multiframe bit 9 is used to provide synchronization, in frame 2 bit 9 is used for signaling, in frame 3 for another (and slower) data channel and in frame 4 bit 9 is used for telemetry.

The signaling involves the use of at least two multiframes or, in effect, a super-multiframe, the allocation of the bits in these frames being as follows in the present case:

(a) bit 1, FG, is a flag bit - set in successive frames to 0's and 1's so as to define a byte 01111110, which indicates that a signaling word is present.

(b) the next bits, LI, are used to indicate length, i.e., how many frames are embraced by the signaling word.

(c) next bits, SI, form a service indicator, e.g., an address to be used for the signaling word.

(d) then there is a block of bits labelled INFORMATION, used to convey the signaling information.

(e) a frame check sequence CRC, usable in checking frame alignment and in checking for the presence of data bit errors.

An alternative use of the ninth and tenth bits is shown in FIG. 2. Here bits 9 and 10 are used together so that the four-frame multiframe gives a 16 kb/s channel, of which bit 1 is used for synchronization in alternate channels, bits 2, 3 and 4, plus bit 1 in alternate channels, giving a 14 kb/s signaling channel the bit allocation of which is as for the signaling channel of FIG. 1.

Figure 3:
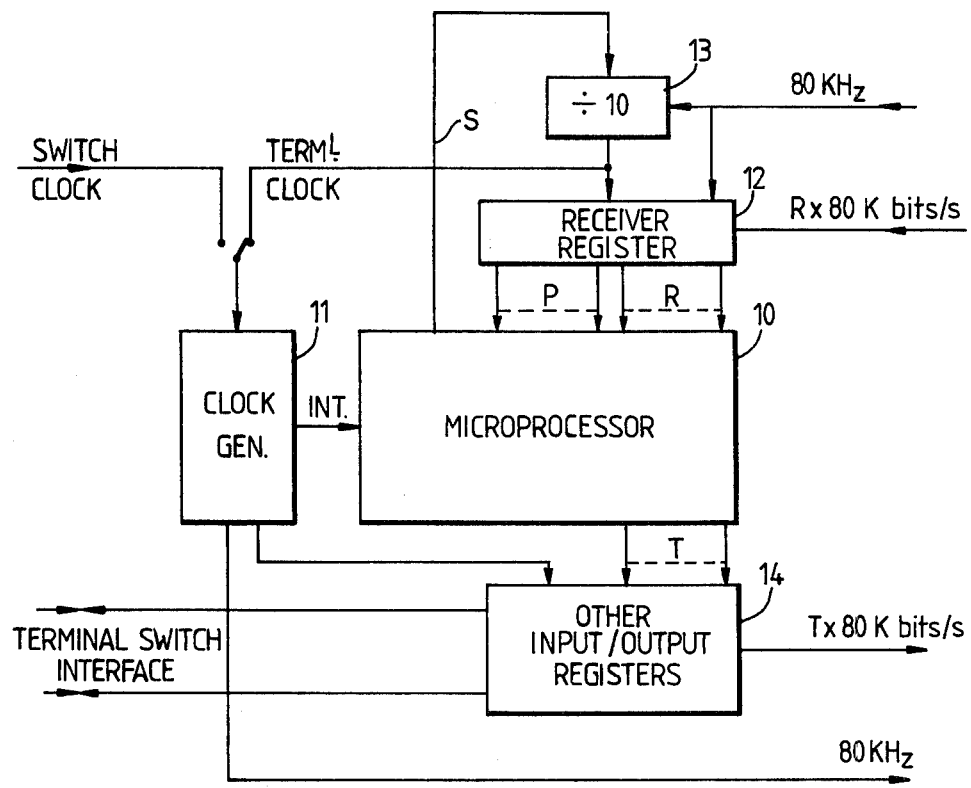
FIG. 3 is a simplified block diagram of a receiver embodying the present invention.
Figure 7:
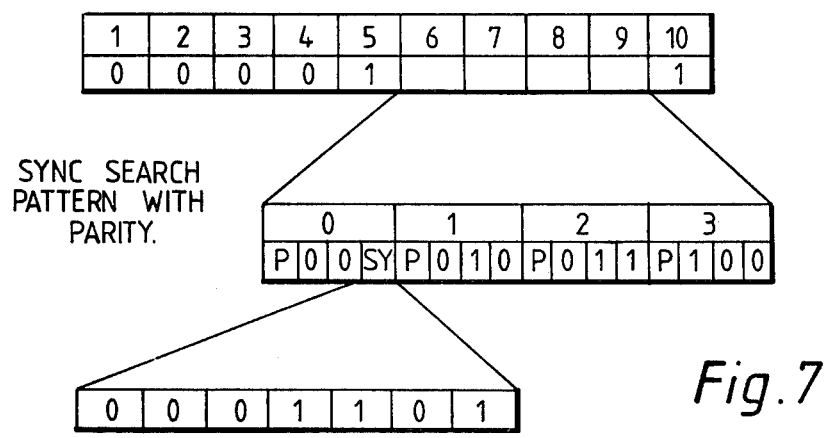

The "hardware" used in the receiver disclosed includes a microprocessor 10 shown functionally in FIG. 3. The synchronization search program is started by an interrupt signal provided at regular time intervals by a clock generator 11. This occurs once per frame, since it not practicable for the interval to be a bit period, since that does not permit a sufficient number of processor instructions between interrupts.

The received 80 kb/s line signal including the above-described synchronization pattern is entered into a sixteen bit serial/parallel register 12 under control of a received 80 KHz clock pulse train, as shown. This received clock pulse train is divided in a divide-by-ten circuit 13 to give a received frame clock train. The line signal passes from the register 12 into the microprocessor 10 as a sixteen bit sample over parallel conductors P and R. When microprocessor 10 is correctly synchronized the first byte consists of a PCM octet, while the first two bits of the second byte are the additional bits (bit 9 and 10, FIG. 1 or 2) used to make up the ten bit frame. The remaining six bits in the word are bits 1–6 of the next frame, and have no function with respect to the current frame.

In normal operation in the "traffic" state, each PCM octect transferred to microprocessor 10 over parallel conductors P and R is immediately transferred on conductors T to an output register in the block 14, but during the sync search state, all sixteen bits in the register 12 are examined in microprocessor 10 for a synchronization pattern - see below. Registers with accommodation for the entire 80 kb/s of a frame of transmitted traffic, including voice traffic, are loaded or read once per frame, and registers for other traffic or signaling are serviced by the microprocessor 10 at the appropriate rate. These registers are included in the block 14.

Figure 4:
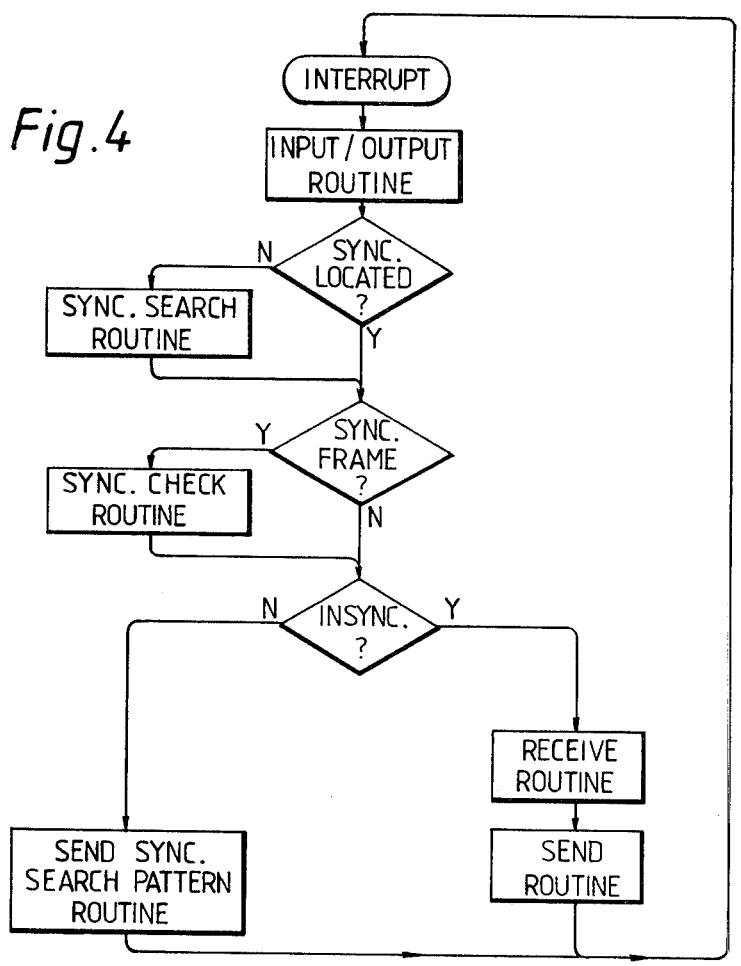
FIG. 4 is a basic flow diagram for synchronization acquisition in a receiver such as that of FIG. 3.

FIG. 4 is an executive level flow diagram for the microprocessor program to regain and check synchronization at the receiver.

Referring back to FIG. 3 bit, frame and multiframe synchronization will now be described. The received 80 kb/s bit steam including the synchronization pattern is isochronous with the terminal's transmit timing. A 80 kb/s bit rate clock is recovered from the incoming bit stream in a well known manner, and applied via the connection shown to the microprocessor 10 and the divider 13. This bit rate clock is used, as shown, to enter the incoming bit stream serially into the register 12, and the contents of register 12 are read by the microprocessor 10 in response to the interrupt signal from generator 11. Thus, provided that an "interlock" is arranged to prevent the register 12 from being up-dated during read-out it is not necessary to re-align bits.

The output from the divider 13 provides a frame clock, which is used to staticize the incoming information in the register 12 and to control the phase of the clock outputs of generator 11. However, for the information to be meaningful the phase of the frame clock needs to be aligned by the synchronization signals. This is achieved by adjusting divider 13 appropriately by a sync control signal S of microprocessor 10.

The microprocessor operates on a "per-frame" basis, but needs to be able to identify the frame within the multiframe. This is achieved by aligning a frame counter in generator 11 in a known manner to the frame containing the synchronization signal.

Figure 5:
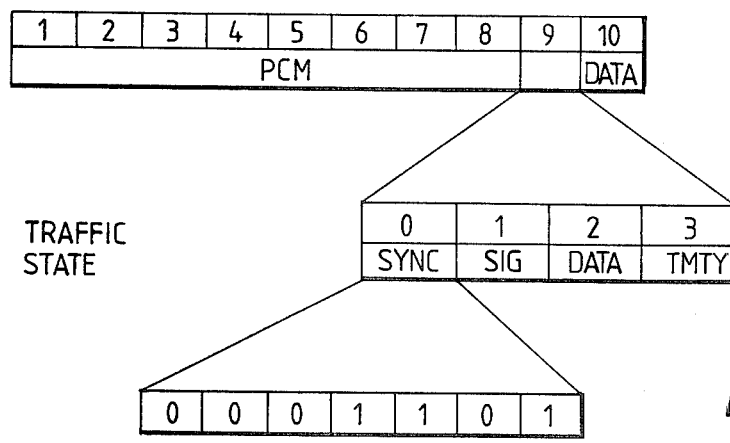
FIGS. 5, 6, and 7 show synchronization search patterns usable in a receiver such as that of FIG. 3.
Figure 6:
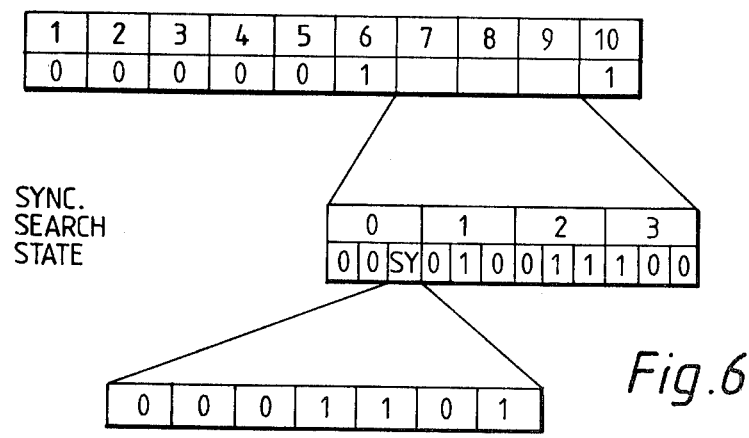

Synchronization search will now be described with special reference to FIGS. 5 and 6. When the receiver is out of sync it is necessary to receive a signal from the transmitter to enable sync to be found. This signal is referred to herein as a synchronization search pattern (SSP) and is requested by the receiver when an out-of-sync state is detected over the output of registers 14. The SSP includes the same synchronization pattern as is used in normal transmission, so as to avoid complications when changing from the Sync Search Routine to the Sync Check Routine (used in the "in-sync" state). Further, SSP does not include any traffic since that would serve no useful purpose and would confuse the detection system. In fact, any traffic bits would, when the out-of-sync state is present, be scrambled.

Thus, the simplest form of SSP is sync+zero, i.e., the sync pattern in its normal position, bit 9 in the appropriate PCM word in frame 0 of the multiframe, and all other time slot bits at zero. This has the disadvantage that since only 1 in 40 bits are sync bits and only about half of them are '1' bits, it can be a relatively long time, e.g., 2 ms (milliseconds), before a sync bit is detected, and a further period, e.g. 4 ms, is needed to check the sync pattern. In a noisy environment many false detections may occur, each detection having to be checked with the sync pattern, which extends the time needed for a true detection of sync several fold. Further, the sync-check itself may fail due to an error in the sync pattern, causing a false rejection or requiring the check to take place over several sync pattern intervals.

In the present system, sync detection during sync search is improved by using the bandwidth normally occupied by traffic. The additional sync information needed consists of a pointer to the location of the sync bit, the identity of the frame within the multiframe, and the identity of the multiframe within the sync pattern sequence. Ideally this information should be contained within a single frame.

In the present system there are four frames in a multiframe, so the identities of the frame of the multiframe can be encoded using two bits. Since the ninth bit is used for sync, see FIG. 5, the two bits to provide this code are placed in the seventh and eighth bit position when in the sync search state, see FIG. 6. Bits 7, 8 and 9 together provide for eight combinations, two of which can occur in the sync-frame of the multiframe, since the sync-bit (the ninth) can be 0 or 1. Thus, six identifiable combinations can be allocated to the non-sync frames, which gives a maximum capability of seven frames per multiframe.

In a word being considered in a given frame, the seventh, eighth and ninth bits can be of either polarity so their location is only identifiable if they have a unique pattern. The resulting ten-bit word must form a cyclically permutable code, and must not be degenerate, i.e., must only appear once in any ten bits of repeated sequence. These criteria are satisfied by setting the sixth and tenth bits of the word to 1, see FIG. 6. This shows the utilization of bits seven to nine during sync search, plus the sixth and tenth bits at 1.

During the sync search process, a complete frame of information is entered into the microprocessor 10, but its orientation with respect to the desired sync pattern stored in microprocessor 10 is not known. Hence, the search process shifts, i.e., rotates, the received information entered therein until two 1 bits are located five bits apart with all zeros between them. The amount of shift needed to achieve this is a measure of frame displacement and is used to adjust the frame clock divider 13 via conductor S. Frame synchronization is acquired under control of this process at the next entry. The frame identity can also be read and stored in the microprocessor 10 memory, and incremented at each interrupt signal from generator 11.

In a noisy environment, there is a probability of locating two 1 bits five bits apart, one of which is erroneous. This would give a false detection of sync, which would be rejected later but would waste time. However, testing the bits between the two 1's for zero enables such an error to be detected and the sync attempt to be aborted.

An error in the seventh, eighth and ninth bits gives a false frame identity, so the sync pattern is sought in the wrong frame. Thus, sync-check fails, with the resultant time penalty. Thus, it can be shown that with a bit error rate of 1 in $10^3$, 1 in 3,600 sync attempts fail for this reason. This can be avoided by the use of an extra bit for parity, e.g. by using bits six to nine for sync search purposes, in which case the sync pointer bits are now four bits apart, and there are two such combinations in the frame, i.e. the cyclic code is degenerate. If odd parity is used this difficulty is resolvable but it needs extra microprocessor instructions. The value of parity in this case is thus a matter of a "trade-off" in the prevailing error enviorment. In systems with 11 or more bits per word, there is no penalty involved in including parity, which is then a useful addition.

The microprocessor arrangement operates satisfactorily with any synchronization code, but a pseudo-random polynomial has advatages since it is easily generated and detected, either in hardware or in software. Further, although it is difficult to simulate, in traffic, it is very quickly identified to be correct or incorrect. The shortest produced pseudo-random sequence is $(2^3-1)$, i.e. 0001101. Another useful synchronization pattern is the 15 bit sequence $(2^4-1)$. Either of these can be readily generated using feedback shift register arrangements.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a digital PCM receiver, means for receiving intelligence in a bit stream having a plurality of bit frames, each of said plurality of bit frames comprising an "x" bit PCM code combination, an (x+1)th bit usable, inter alia, for conveying synchronization information, and at least an (x+2)th bit usable for conveying other intelligence; said receiving means being operable when the need for a synchronization search is detected for receiving synchronization information in a plurality of "y" adjacent bits of said "x" bits including the "x"th bit, and wherein said (x+2)th bit and the bit preceding said plurality of "y" adjacent bits are both a first binary condition with all other bits of said "x" bits being a second binary condition such that a bit pattern received during synchronization search includes two bits in said binary condition separated by x−y bits in said second binary condition.

2. A digital PCM receiver in accordance with claim 1, further comprising:
a clock pulse source; and said means for receiving said bit stream includes
a buffer store for storing a predetermined number of bits of said bit stream;
means for examining said stored bits for the presence of the combination of two bits in said first condition separated by x−y bits in said second condition;
means coupled to said clock pulse source for shifting said stored bits under clock pulse control until said combination is detected; and
means for adjusting said clock pulse source in accordance with the extent of shifting by said shifting means for bringing said clock pulse source into alignment with said bit stream.

3. A receiver in accordance with claim 2, wherein one of said "y" adjacent bits is a parity bit.

4. In a digital PCM receiver in which intelligence is conveyed in a bit stream having a plurality of ten bit frames each of which can include a normal eight bit PCM code combination, a ninth bit usable, inter alia, for conveying synchronization information and a tenth bit usable for conveying other intelligence; said receiver comprising:
means operable during a synchronization search for receiving the seventh and eighth bits of said eight bit PCM code combination in a "0" state such that the pattern received in adjacent ones of said ten bit frames includes two bits in a "1" state separated by five bits in a "0" state;
means coupled to said receiving means for storing said ten bit frames;
means coupled to said storing means for examining said stored bits for the presence of said pattern of two "1" bits separated by five "0" bits;
means coupled to said storing means for shifting said ten bit frames in said storing means until said pattern is detected and the extent of shift needed to detect said pattern is determined; and
means coupled to said shifting means for adjusting a clock in accordance with said determined extend of shift, whereby said clock is brought into alignment with said bit stream.

* * * * *